(12) United States Patent
Li et al.

(10) Patent No.: US 12,536,424 B2
(45) Date of Patent: Jan. 27, 2026

(54) INTENTION RECOGNITION METHOD AND APPARATUS, READABLE MEDIUM, AND ELECTRONIC DEVICE

(71) Applicant: Beijing Youzhuju Network Technology Co., Ltd., Beijing (CN)

(72) Inventors: Xiaoyang Li, Beijing (CN); Zilin Yu, Beijing (CN); Xiangyang Zhang, Beijing (CN); Xiaogang Tian, Beijing (CN); Zejun Ma, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 30 days.

(21) Appl. No.: 18/444,050

(22) Filed: Feb. 16, 2024

(65) Prior Publication Data

US 2024/0185046 A1 Jun. 6, 2024

Related U.S. Application Data

(63) Continuation of application No. PCT/CN2022/132141, filed on Nov. 16, 2022.

(30) Foreign Application Priority Data

Nov. 19, 2021 (CN) .......................... 202111402778.1

(51) Int. Cl.
*G06N 3/063* (2023.01)
(52) U.S. Cl.
CPC .................................... *G06N 3/063* (2013.01)
(58) Field of Classification Search
CPC .......... G06N 3/063; G06N 3/08; Y02D 10/00; G06F 16/3344; G06F 16/383
See application file for complete search history.

(56) References Cited

U.S. PATENT DOCUMENTS

2020/0210839 A1\* 7/2020 Lo ........................ H03M 7/3059
2020/0242302 A1 7/2020 Liang et al.
(Continued)

FOREIGN PATENT DOCUMENTS

CN 110377686 A 10/2019
CN 111159346 A 5/2020
(Continued)

OTHER PUBLICATIONS

Wenxiao Wang, Wei Chen, Yicong Luo, Yongliu Long, Zhengkai Lin, Liye Zhang, Binbin Lin, Deng Cai, & Xiaofei He. (2024). Model Compression and Efficient Inference for Large Language Models: A Survey. https://arxiv.org/abs/2402.09748 (Year: 2024).\*

(Continued)

*Primary Examiner* — Omar F Fernandez Rivas
*Assistant Examiner* — Michael C. Lee
(74) *Attorney, Agent, or Firm* — Astute IP Law Group

(57) ABSTRACT

The present application relates to an intention recognition method and apparatus, a readable medium, and an electronic device. The method includes: by means of a preset intention recognition quantification model, performing a quantification operation on a dot product of a query vector and a key vector which correspond to each character in a target text, so as to obtain a fixed-point type target vector of a first bit; according to the fixed-point type target vector, determining, by means of a target mapping relationship, a floating-point type attention weight of a second bit corresponding to each character; and according to the floating-point type attention weight, determining a target intention corresponding to the target text, the first bit being smaller than the second bit.

15 Claims, 6 Drawing Sheets

(56) References Cited

U.S. PATENT DOCUMENTS

| | | | |
|---|---|---|---|
| 2021/0248450 A1* | 8/2021 | Tay | C12N 15/00 |
| 2023/0028226 A1* | 1/2023 | Thorsley | G06N 3/082 |
| 2023/0154221 A1* | 5/2023 | Gu | G06F 18/253 |
| | | | 382/156 |
| 2024/0104342 A1* | 3/2024 | Li | G06N 3/0464 |

FOREIGN PATENT DOCUMENTS

| | | | |
|---|---|---|---|
| CN | 112287672 A | 1/2021 | |
| CN | 112313642 A | 2/2021 | |
| CN | 113255354 A | 8/2021 | |
| CN | 114090740 A | 2/2022 | |
| WO | 2020140612 A | 7/2020 | |
| WO | 2021204017 A1 | 10/2021 | |

OTHER PUBLICATIONS

Shen, Sheng, et al. "Q-BERT: Hessian Based Ultra Low Precision Quantization of BERT." arXiv preprint arXiv:1909.05840 (2019) (Year: 2019).*

Ham, Tae Jun, et al. "A3: Accelerating attention mechanisms in neural networks with approximation." 2020 IEEE International Symposium on High Performance Computer Architecture (HPCA). IEEE, 2020, pp. 328-341 (Year: 2020).*

International Search Report for PCT/CN2022/132141, mailed Jan. 28, 2023, 6 pages.

Meng et al., "Query Intention Recognition Model Based on Character Level Cyclic Network", Computer Engineering, vol. 43, No. 3, Mar. 2017, 6 pages, English translation of Abstract.

Office Action for Chinese Patent Application No. 202111402778.1, mailed Mar. 23, 2023, 9 pages.

* cited by examiner

INTENTION RECOGNITION METHOD AND APPARATUS, READABLE MEDIUM, AND ELECTRONIC DEVICE

CROSS-REFERENCE TO RELATED APPLICATIONS

The present application is a continuation of International Patent Application No. PCT/CN2022/132141, filed on Nov. 16, 2022, which claims the priority of China patent application No. "202111402778.1" filed on Nov. 19, 2021 with the application name of "INTENTION RECOGNITION METHOD AND APPARATUS, READABLE MEDIUM, AND ELECTRONIC DEVICE", and the entire contents of this China patent application are incorporated by reference in the disclosure application.

TECHNICAL FIELD

The application relates to the field of artificial intelligence, in particular to an intention recognition method, apparatus, readable medium and electronic apparatus.

BACKGROUND ART

Most of the parameters in the intention recognition model based on neural network are represented by 32-bit floating-point numbers. Usually, the original 32-bit floating-point numbers can be represented by low-bit data types (that is, model quantization) to achieve the purpose of reducing model volume and accelerating model inference.

At present, the intent recognition model needs a large amount of calculation, so even if the model is quantized, there are still problems that the model operation takes a long time and the model recognition efficiency needs to be improved.

SUMMARY OF THE INVENTION

This section is provided to introduce the concepts in a brief form, which will be described in detail in the detailed description later. This part is not intended to identify the key features or essential features of the claimed technical solution, nor is it intended to limit the scope of the claimed technical solution.

The application provides an intention recognition method, device, readable medium and electronic apparatus.

In a first aspect, the present disclosure provides an intention recognition method, which comprises:

acquiring a target text to be recognized; and taking the target text as the input of a preset intention recognition quantization model to output the target intention of the target text;

wherein, the preset intention recognition quantization model is configured to quantize the dot product of a query vector and a key vector corresponding to each character in the target text to obtain a fixed-point target vector of a first bit, determine a floating-point attention weight of a second bit corresponding to each character through a target mapping relationship according to the fixed-point target vector, and determine a target intention corresponding to the target text according to the floating-point attention weight, wherein the first bit is smaller than the second bit.

In a second aspect, the present disclosure provides an intention recognition apparatus, which comprises:

an acquisition module configured to acquire a target text to be recognized; and a recognition module configured to take the target text as an input of a preset intention recognition quantization model to output the target intention of the target text;

wherein, the preset intention recognition quantization model is configured to quantize the dot product of a query vector and a key vector corresponding to each character in the target text to obtain a fixed-point target vector of a first bit, determine a floating-point attention weight of a second bit corresponding to each character through a target mapping relationship according to the fixed-point target vector, and determine a target intention corresponding to the target text according to the floating-point attention weight, wherein the first bit is smaller than the second bit.

In a third aspect, the present disclosure provides a computer-readable medium on which a computer program is stored, wherein the program, when executed by a processing device, realizes the steps of the method described in the first aspect above.

In a fourth aspect, the present disclosure provides an electronic apparatus comprising:

a storage device on which one or more computer programs are stored; and one or more processing devices for executing the one or more computer programs in the storage device to realize the steps of the method described in the first aspect above.

According to the technical scheme, the dot product of a query vector and a key vector corresponding to each character in the target text is quantized through the preset intention recognition quantization model to obtain a fixed-point target vector of a first bit, the floating-point attention weight of a second bit corresponding to each character is determined through a target mapping relationship according to the fixed-point target vector, and the target intention corresponding to the target text is determined according to the floating-point attention weight, the first bit is smaller than the second bit, and the complicated calculation process of determining the floating-point attention weight of the second bit corresponding to each character can be adjusted to the process of finding the correspondence relationship from the target mapping relationship to determine the floating-point attention weight, thus effectively reducing the model computation and improving the model recognition efficiency.

Other features and advantages of the present disclosure will be described in detail in the detailed description section that follows.

BRIEF DESCRIPTION OF DRAWINGS

The above and other features, advantages and aspects of embodiments of the present disclosure will become more apparent by referring to the following detailed description when taken in conjunction with the accompanying drawings. Throughout the drawings, the same or similar reference numerals indicate the same or similar elements. It should be understood that the drawings are schematic, and the original and elements are not necessarily drawn to scale. In the attached drawings.

DETAILED DESCRIPTION

Figure 1:
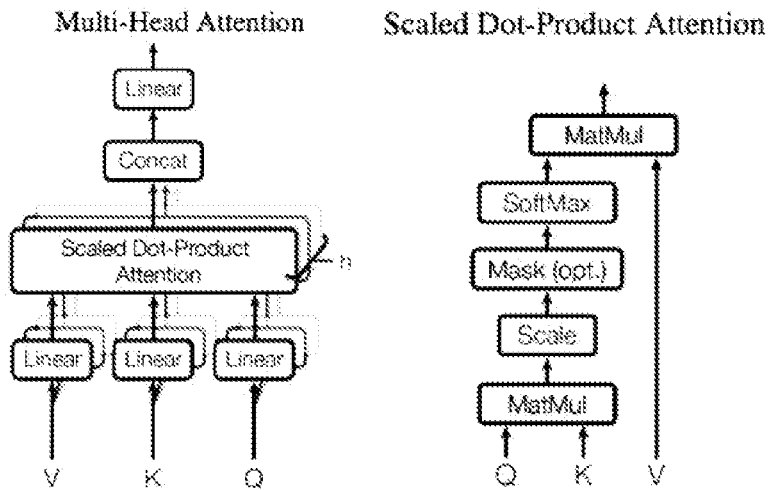
FIG. 1 is a schematic diagram of a multi-head attention structure shown in an exemplary embodiment of the present disclosure.

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth here, but rather, these embodiments are provided for a more thorough and complete understanding of the present disclosure. It should be understood that the drawings and embodiments of the present disclosure are only used for illustrative purposes, and are not used to limit the protection scope of the present disclosure.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect.

As used herein, the term "including" and its variants are open-ended including, that is, "including but not limited to". The term "based on" is "at least partially based on". The term "one embodiment" means "at least one embodiment"; the term "another embodiment" means "at least one other embodiment"; and the term "some embodiments" means "at least some embodiments". Related definitions of other terms will be given in the following description.

It should be noted that the concepts of "first" and "second" mentioned in this disclosure are only used to distinguish different devices, modules or units, and are not used to limit the order or interdependence of the functions performed by these devices, modules or units.

It should be noted that the modifications of "a" and "a plurality" mentioned in this disclosure are schematic rather than limiting, and those skilled in the art should understand that unless the context clearly indicates otherwise, they should be understood as "one or more".

Names of messages or information exchanged among multiple devices in the embodiment of the present disclosure are only used for illustrative purposes, and are not used to limit the scope of these messages or information.

Before introducing the specific embodiments of the present disclosure in detail, firstly, the application scenarios of the present disclosure are described as follows. The present disclosure can be applied to the scenario of intention recognition, for example, the process of intention recognition of the dialogue text input by the user, which can be the text information obtained by voice recognition of the voice information input by the user or the text information input by the user. For another example, in the scene of machine translation, a first text of a first language type input by a user is translated to output a translated text of a second language type corresponding to the first text, which is the intention of the first text.

Figure 2:
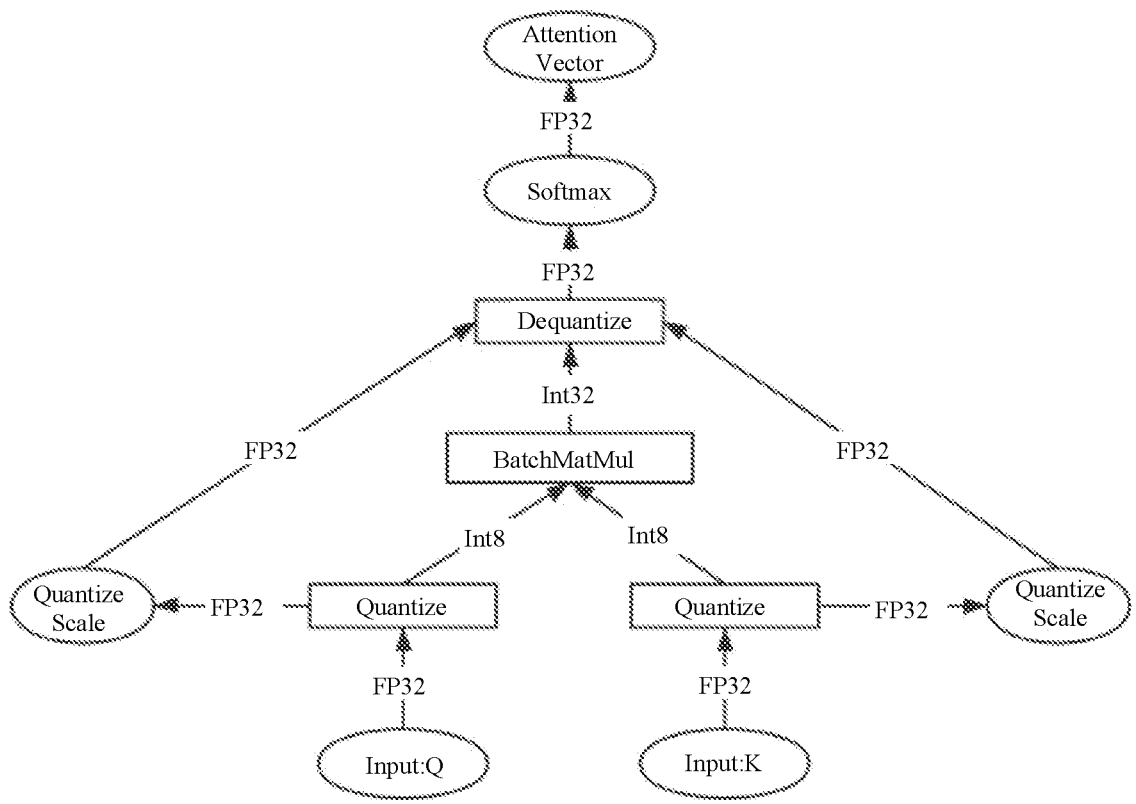
FIG. 2 is a schematic diagram of a multi-head attention structure shown in another exemplary embodiment of the present disclosure.

At present, intention recognition is usually based on the intention recognition model trained by a transformer or a Bert model. The transformer/Bert model will include multi-head attention structure, feed forward structure and add & norm structure. The multi-head attention structure is shown in FIG. 1 (FIG. 1 is a schematic diagram of a multi-head attention structure shown in an exemplary embodiment of the present disclosure). In this multi-head self-attention structure, Q, K and V are taken as inputs, where Q is the query vector corresponding to a given task, and K is the KEY vector (that is, the key vector) corresponding to a given task. V is the VALUE vector (that is, the numerical value vector) corresponding to a given task, and the multi-head attention mechanism is essentially an addressing process. By calculating the attention distribution of the key vector K and adding it to the numerical value vector V, the attention numerical value can be calculated. In the related art, in order to reduce the model volume, the parameters in the intent recognition model are usually quantized according to the following flow shown in FIG. 2. As shown in FIG. 2 (which is a schematic diagram of a multi-head attention structure shown in another exemplary embodiment of the disclosure), the Q matrix and the K matrix are quantized through a quantization node before a BatchedMatmul node. And the data of int32 (32-bit fixed-point data) output by the BatchedMatmul node is dequantized to get the data of FP32((32-bit floating-point data), and then the attention weight calculated through a softmax node, so as to get a non-fully quantized intention recognition model, that is, the data type of the data received by the softmax node is FP32. In the process of data processing of the softmax node, the corresponding data type is always FP32, and the calculation time of the Softmax node reaches more than 30% of the total calculation time of the self-attention layer. Therefore, it is obvious that such a non-global quantization model is not conducive to shortening the model operation time and effectively improving the recognition efficiency of the intention recognition model.

In order to solve the above technical problems, the present disclosure provides an intention recognition method, device, readable medium and electronic apparatus. In the method, the dot product of a query vector and a key vector corresponding to each character in the target text is quantized through the preset intention recognition quantization model to obtain a fixed-point target vector of a first bit, and the floating-point attention weight of a second bit corresponding to each character is determined through the target mapping relationship according to the fixed-point target vector. According to the floating-point attention weight, the target intention corresponding to the target text is determined, and the first bit is smaller than the second bit. Therefore, the complicated calculation process of determining the floating-point attention weight of the second bit corresponding to each character can be adjusted to the process of finding the correspondence relationship from the target mapping relationship, so as to determine the floating-point attention weight, thereby effectively reducing the model computation and improving the model recognition efficiency.

The embodiments of the present disclosure will be described in detail with specific examples.

Figure 3:
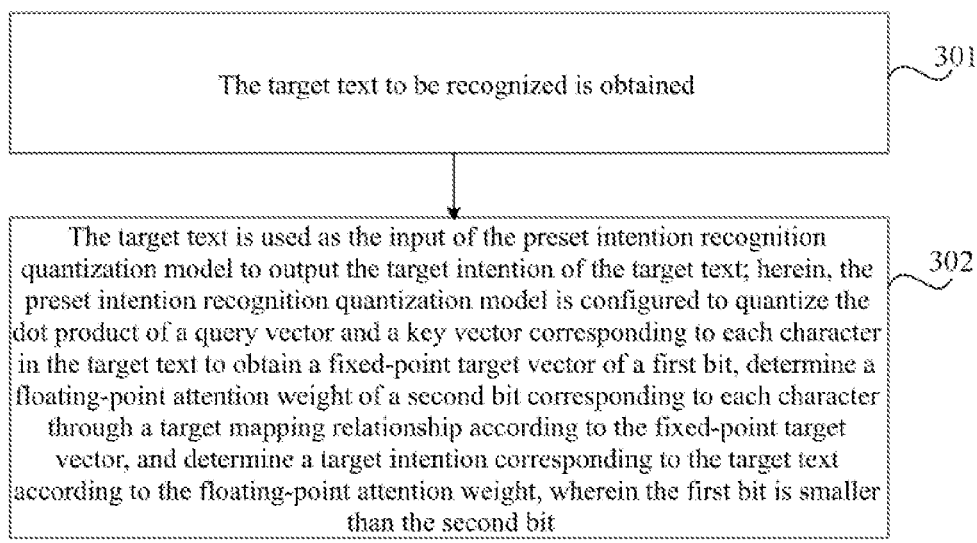
FIG. 3 is a flowchart of an intention recognition method according to an exemplary embodiment of the present disclosure.

FIG. 3 is a flowchart of an intention recognition method according to an exemplary embodiment of the present disclosure; and as shown in FIG. 3, the method may include the following steps:

Step 301: the target text to be recognized is obtained.

Among them, the target text can be a character sequence input by the user in the man-machine dialogue system, or a voice text obtained after the voice information input by the user is recognized by the man-machine dialogue system.

Step 302, the target text is used as the input of the preset intention recognition quantization model to output the target intention of the target text; herein, the preset intention recognition quantization model is configured to quantize the dot product of a query vector and a key vector corresponding to each character in the target text to obtain a fixed-point target vector of a first bit, determine a floating-point attention weight of a second bit corresponding to each character through a target mapping relationship according to the fixed-point target vector, and determine a target intention corresponding to the target text according to the floating-point attention weight, wherein the first bit is smaller than the second bit.

In some embodiments, the target mapping relationship is a correspondence between a storage address and data stored in the storage address, or the target mapping relationship is a correspondence between a list number and data stored in the list of the list number.

For example, the first bit may be 8 bits or 16 bits. When the first bit is 8 bits, the data type of the target vector is int8, when the first bit is 16 bits, the data type of the target vector is int16, and the second bit may be 32 bits. The target mapping relationship may be the correspondence relationship between the storage address and the data stored in the storage address. It may also be the correspondence between the list number and data stored in the list of the list number. When the first bit is 8 bits, the list number may be an integer between 0 and 255, $\rho e^{-0 \cdot S_3}$ is stored in the list numbered 0, $\rho e^{-2 \cdot S_3}$ is stored in the list numbered 2 and $\rho e^{-255 \cdot S_3}$ is stored in the list numbered 255, in which $\rho$ and $S_3$ may be preset model parameters. If the fixed-point target vector corresponding to the current character is $\vec{A}=(x, y, z)$, the obtained floating-point attention weight may be $(\rho e^{-x \cdot S_3}, \rho e^{-y \cdot S_3}, \rho e^{-z \cdot S_3})$.

According to the technical scheme, the complicated calculation process of determining the floating-point attention weight of the second bit corresponding to each character can be adjusted to the process of finding the correspondence relationship from the target mapping relationship, so as to determine the floating-point attention weight, thereby effectively reducing the model computation and improving the model recognition efficiency.

In some embodiments, the preset intention recognition quantization model includes at least one multi-head attention layer, which includes a quantization node and a look-up table node coupled with the output end of the quantization node.

The quantization node is configured to quantize the dot product of the query vector and the key vector corresponding to the character in the target text to obtain the fixed-point target vector of the first bit, and inputting the fixed-point target vector into the look-up table node.

The look-up table node is configured to determine the floating-point attention weight of the second bit corresponding to each character according to the fixed-point target vector through the target mapping relationship.

For example, if the fixed-point target vector is multidimensional (e.g., 32-dimensional, 64-dimensional, 128-dimensional, etc.), when the look-up table node determines the floating-point attention weight of the second bit corresponding to each character by looking up the target mapping relationship, in order to improve the data reading efficiency, it may find multiple data at a time by vectorization accelerating. For example, on the X86 platform supporting the AVX512 instruction set, the output numerical values corresponding to 16 elements in the fixed-point target vector may be found by an instruction _mm512_permutexvar_ps at one time, so if the fixed-point target vector is 64-dimensional, the output numerical values corresponding to the fixed-point target vector may be found only by querying for 4 times.

It should be noted that during the experiment, when the data type of the fixed-point target vector is int8, the numerical value range of each element in the fixed-point target vector is −127 to 127, because the floating-point attention weight of the second bit corresponding to the fixed-point target vector X may be calculated by the following formula:

$$SoftmaxFloat\ \vec{X} = \frac{e^{x_i}}{\sum_{j=1}^{M} e^{x_j}}$$

Among them, $x_i$ is an element in the fixed-point target vector $\vec{X}$, and $e^{x_i}$ needs to be calculated for each element in the fixed-point target vector $\vec{X}$ in the calculation process of attention weight. Usually, the fixed-point target vector $\vec{X}$ has more dimensions, so the whole calculation process will take a long time. The quantization formula corresponding to the above calculation formula of floating-point attention weight is:

$$SoftmaxFloat\ \vec{X} = \frac{e^{x_i s_3}}{\sum_{j=1}^{M} e^{x_j s_3}} = \frac{e^{-(x_{max}-x_i)s_3}}{\sum_{j=1}^{K} e^{-(x_{max}-x_j)s_3}}$$

Herein, $x_{max}=\max\{x_i\}$, that is, $x_{max}$ is the largest element in the fixed-point target vector $\vec{X}$, the $e^{-(x_{max}-x_i)S_3}$ corresponding to each numerical value may be calculated in advance within a numerical value range of $x_{max}-x_i$, and the correspondence relationship between each numerical value of $x_{max}-x_i$ and $e^{-(x_{max}-x_i)S_3}$ may be established to obtain the target mapping relationship. When the data type of the fixed-point target vector is int8, the numerical value range of each element in the fixed-point target vector is −127 to 127, and the numerical value range of $x_{max}-x_i$ is 0 to 254. Therefore, when $x_{max}-x_i$ is 0, $e^{-0 \cdot S_3}$ is found according to the target mapping relationship, when $x_{max}-x_i$ is 2, $e^{-2 \cdot S_3}$ is found according to the target mapping relationship, similarly, when $x_{max}-x_i$ is 8, $e^{-8 \cdot S_3}$ is found according to the target mapping relationship, and when $x_{max}-x_i$ is 254, $e^{-254 \cdot S_3}$ is found according to the target mapping relationship, $S_3$ may be a preset quantization scale, and for the numerical value of $x_{max}-x_i$ corresponding to each target text, $e^{-(x_{max}-x_i)S_3}$ may be found from the correspondence relationship. In this way, the complicated calculation process of determining the floating-point attention weight of the second bit corresponding to each character can be adjusted to the process of finding the correspondence relationship from the target mapping relationship to determine the floating-point attention weight, so that the model computation can be effectively reduced and the model recognition efficiency may be improved under the condition of ensuring the model recognition accuracy.

Moreover, for $e^{-K \cdot S_3}$ when k is an integer between 0 and 255, the $e^{-K \cdot S_3}$ corresponding to only 0 to 15 is greater than the preset threshold $10^{-6}$, and the $e^{-K \cdot S_3}$ corresponding to numerical values between 16 and 255 are all less than $10^{-6}$, and the difference between each other is very small, so the $e^{-K \cdot S_3}$ between 16 and 255 may be approximated as $e^{-15 \cdot S_3}$, which will not only affect the accuracy of the model, but also help to improve the speed of data processing of the model. That is to say, the element numerical value in the numerical values $e^{-K \cdot S_3}$ corresponding to numerical values between 0 and 255 that is less than $10^{-6}$ may be set as $e^{-15 \cdot S_3}$, for example, a register may be used to store the first 16 numerical values, and the storage addresses (or numbers) of the last 240 numerical values are all set as the storage addresses (or numbers) corresponding to the $16^{th}$ numerical value, and the $16^{th}$ numerical value is decimal 15, and the numerical value stored in the storage unit corresponding to the number 15 is $e^{-15 \cdot S_3}$. The storage addresses (or numbers) of the last 240 numerical values are all set to 15, so that when the $e^{-K \cdot S_3}$ corresponding to numerical values with $x_{max} - x_i$ greater than 15 are queried, the $e^{-15 \cdot S_3}$ numerical value corresponding to 15 may be used as the output result, or the size of the preset threshold may be changed according to the needs of model accuracy, for example, the storage addresses (or numbers) corresponding to the remaining 224 numerical values except 0 to 31 among 256 numerical values may be set to 31. The $e^{-K \cdot S_3}$ corresponding to the remaining 224 numerical values is replaced with the data $e^{-15 \cdot S_3}$ numbered 0031 (decimal), and when searching data according to the number, since the binary data corresponding to 0 to 15 is 0000 0000 to 0000 1111, and the binary data corresponding to 16 to 31 is 0001 0000 to 0001111, the number with the fourth digit of the number being 0000 to 1111 is used as a query number. This may not only effectively reduce the model size under the condition of ensuring the accuracy of model recognition, but also effectively save the time of table lookup, thus effectively improving the efficiency of model recognition.

Figure 4:
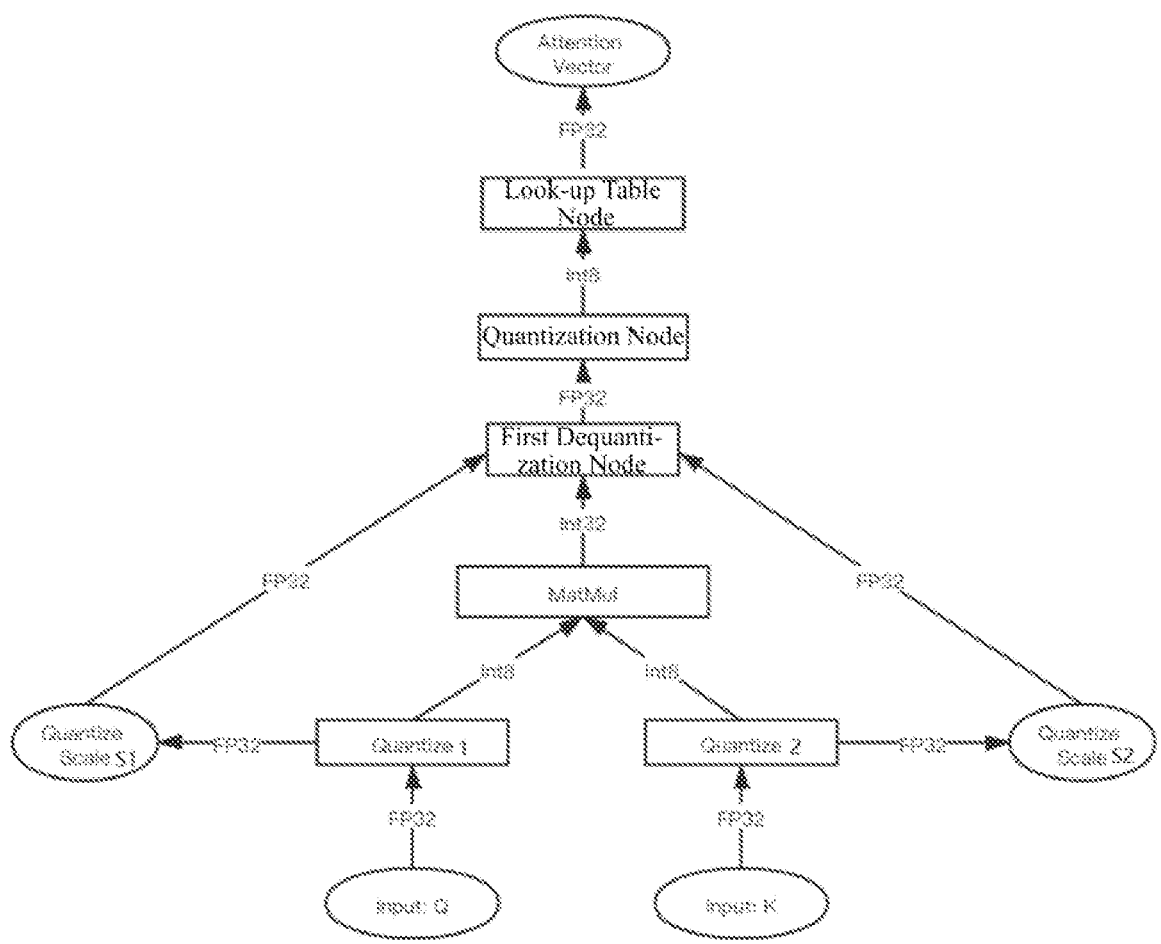
FIG. 4 is a schematic structural diagram of a multi-head attention layer according to another exemplary embodiment of the present disclosure.

In some embodiments, FIG. 4 is a structural schematic diagram of a multi-head attention layer according to another exemplary embodiment of the present disclosure. The structure of the multi-head attention layer may be as shown in FIG. 4, and the multi-head attention layer further comprises a Matmul node and a first dequantization node coupled with the output end of the Matmul node, and the output end of the first dequantization node is coupled with the input end of the quantization node;

The Matmul node is configured to acquire a query matrix and a key matrix corresponding to a target text sequence to be recognized, wherein the query matrix consists of query vectors corresponding to respective characters in the target text, and the key matrix consists of key vectors corresponding to respective characters in the target text;

The Matmul node is further configured to obtain the target product of the query matrix and the key matrix, so as to obtain a specified matrix formed by the dot product of the query vector and the key vector corresponding to each character in the target text, and the specified matrix is fixed-point data of a third bit, which is greater than the first bit;

The first dequantization node is configured to dequantize the specified matrix to obtain a floating-point product matrix of the second bit;

The quantization node is configured to quantize the floating-point product matrix to obtain the target matrix of the first bit, and the target matrix includes the fixed-point target vectors corresponding to respective characters;

The look-up table node is configured to obtain the maximum numerical value of the fixed-point target vector corresponding to each character in the target matrix, and obtain the target difference between each numerical value of the fixed-point target vector and the maximum numerical value, and for the target difference between each numerical value and the maximum numerical value, search for the first median value corresponding to the numerical value from the target mapping relationship according to the target difference to obtain an median value vector corresponding to the fixed-point target vector, herein, the target mapping relationship includes a correspondence relationship between different differences within the preset difference range corresponding to the fixed-point data type of the first bit and the first median value, herein, the first median value is floating-point data of the second bit, and the floating-point attention weight of the second bit corresponding to each character is determined according to the median value vector.

For example, when the first bit is 8, the fixed-point data type of the first bit is int8, and the corresponding numerical value range of the (fixed-point data type) int8 is −127 to 127, and the corresponding preset difference numerical value range is 0 to 254, where the first median value may be calculated according to the first preset function relation $e^{-K \cdot S_3}$, herein, K is the target difference numerical value, $e^{-K \cdot S_3}$ is the first median value corresponding to K, and $S_3$ in the formula is the quantization scale output by the quantization node. In this, the fixed-point target vector $\vec{B}=(c, d, e)$, and c, d, e all belong to the data between −127 and 127, where the target difference numerical value corresponding to each numerical value in the $\vec{B}$ is $x_{max}-c$, $x_{max}-d$, $x_{max}-e$, then the first median value corresponding to the numerical value c is $e^{-(x_{max}-c) \cdot S_3}$, the first median value corresponding to the numerical value d is $e^{-(x_{max}-d) \cdot S_3}$, and the first median value corresponding to the numerical value e is $e^{-(x_{max}-e) \cdot S_3}$, thus the median value vector $(e^{-(x_{max}-c) \cdot S_3}, e^{-(x_{max}-d) \cdot S_3}, e^{-(x_{max}-e) \cdot S_3})$ is obtained.

Further, when the look-up table node determines the floating-point attention weight of the second bit corresponding to each character according to the median value vector, it may include the following steps S1 to S3:

S1, the quantization scale output by the quantization node is obtained.

S2, a second median value is calculated according to the target difference numerical value corresponding to each numerical value in the fixed-point target vector and the quantization scale, herein the data type of the second median value is the same as that of the first median value.

In this step, the second median value may be calculated by a second preset function relation, which may be $$\sum_{j=1}^{M} e^{-(x_{max}-x_j)S_3}$$

where M is the dimension of the fixed-point target vector, $x_{max}$ is the maximum numerical value in the fixed-point target vector, and $x_j$ is the $j^{th}$ data in the fixed-point target vector.

S3, the floating-point attention weight is determined according to the median value vector and the second median value.

In this step, the ratio of each numerical value in the median value vector to the second median value may be obtained, so as to obtain the floating-point attention weight.

For example, the fixed-point target vector corresponding to the target text is $\vec{B}=(c, d, e)$, where c, d and e all belong to the data between −127 and 127, where d is the largest and the target difference numerical value of each numerical value in $\vec{B}$ is d–c, d–d, d–e, then the first median value corresponding to the numerical value c is $e^{-(d-c)\cdot S_3}$, the first median value corresponding to the numerical value d is $e^{-0\cdot S_3}$ and the first median value corresponding to the numerical value e is $e^{-(d-e)\cdot S_3}$, so as to obtain the median value vector $(e^{-(d-c)\cdot S_3}, e^{-0\cdot S_3}, e^{-(d-e)\cdot S_3})$. Meanwhile, the second median value is $e^{-(d-c)\cdot S_3}+e^{-0\cdot S_3}+e^{-(d-e)\cdot S_3}$, so as to obtain the floating-point attention weight $(\lambda_1, \lambda_2, \lambda_3)$, in which $\lambda_1$ is $$\frac{e^{-(d-c)\cdot S_3}}{e^{-(d-c)\cdot S_3} + e^{-0\cdot S_3} + e^{-(d-e)\cdot S_3}}$$

$\lambda_2$ is $$\frac{e^{-(d-d)\cdot S_3}}{e^{-(d-c)\cdot S_3} + e^{-0\cdot S_3} + e^{-(d-e)\cdot S_3}}$$

and $\lambda_3$ is $$\frac{e^{-(d-e)\cdot S_3}}{e^{-(d-c)\cdot S_3} + e^{-0\cdot S_3} + e^{-(d-e)\cdot S_3}}$$

According to the technical scheme, the complicated calculation process of determining the floating-point attention weight of the second bit corresponding to each character is adjusted to the process of finding the correspondence relationship from the target mapping relationship through the look-up table node, so that the model computation can be effectively reduced, the model recognition efficiency may be improved, and the accuracy of the preset intention recognition quantization model can be ensured, and the problem of poor accuracy in the fully quantized intention recognition model can be avoided.

Figure 5:
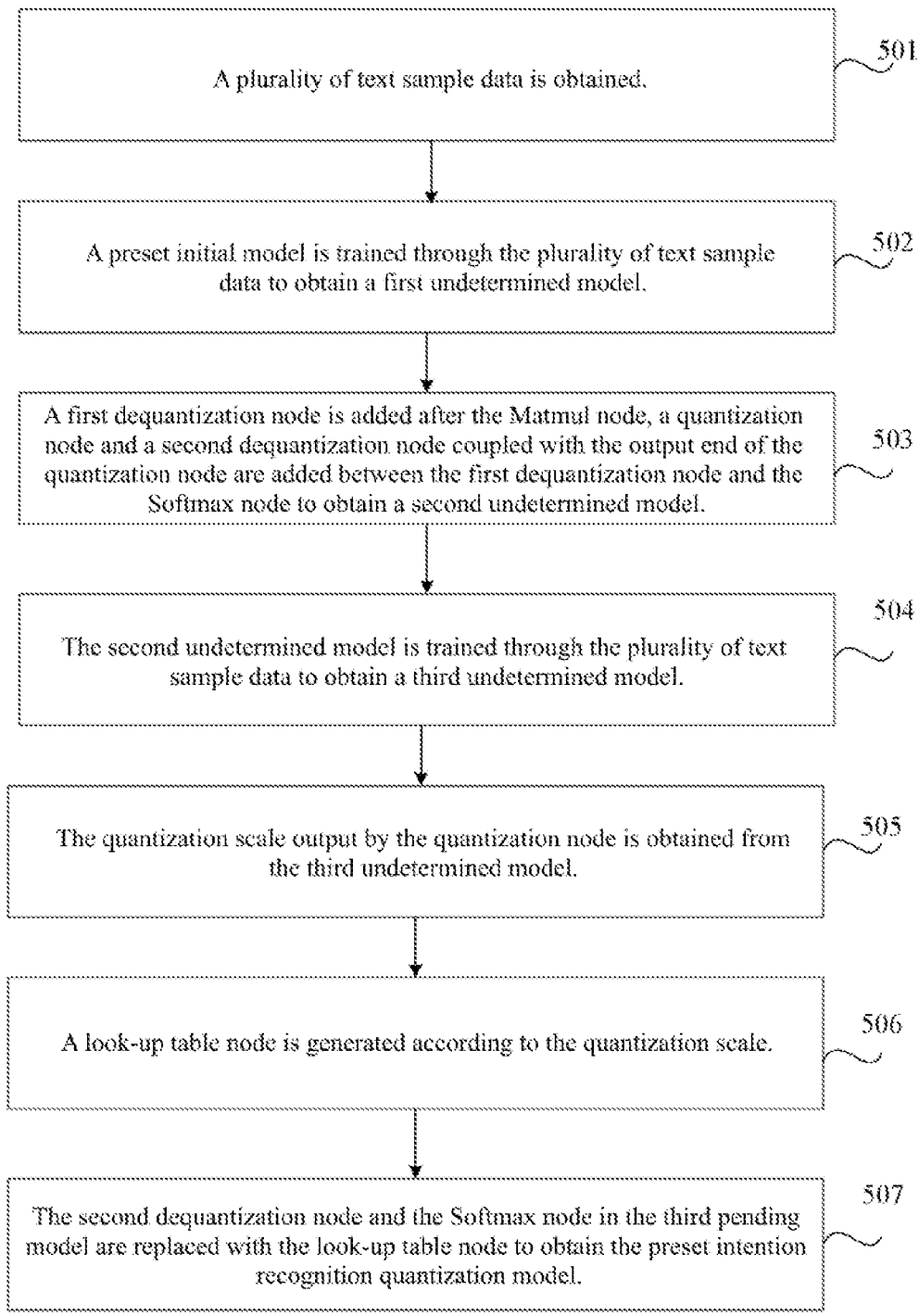
FIG. 5 is a training flow chart of a preset intention recognition quantization model according to an exemplary embodiment of the present disclosure.

In some embodiments, the preset intention recognition quantization model is obtained in advance by the following way as shown in FIG. 5, which is a training flow chart of a preset intention recognition quantization model according to an exemplary embodiment of the present disclosure, as shown in FIG. 5:

Step 501: a plurality of text sample data is obtained.

Herein, the text sequence sample data includes intention labeling data.

For example, the intention tagging data corresponding to the text "I want to book a plane ticket" may be "book a plane ticket", and the intention tagging data corresponding to the text "Play classic English songs" may both be "Play English songs".

Step 502, a preset initial model is trained through the plurality of text sample data to obtain a first undetermined model.

Herein, the preset initial model includes at least one multi-head attention layer, which includes Matmul nodes and Softmax nodes, and the attention layer in the preset initial model may be a multi-head attention structure as shown in FIG. 1.

It should be noted that a preset initial model may include a plurality of multi-head attention layers, for example, a transformer or a Bert model may include a plurality of encoders and decoders composed of multi-head attention layers.

Step 503: a first dequantization node is added after the Matmul node, a quantization node and a second dequantization node coupled with the output end of the quantization node are added between the first dequantization node and the Softmax node to obtain a second undetermined model.

The first dequantization node is configured to dequantize the fixed-point data of the third bit output by Matmul node to obtain the floating-point data of the second bit, the quantization node is configured to quantize the floating-point data of the second bit output by the first dequantization node to obtain the corresponding fixed-point data of the first bit, and the second dequantization node is configured to dequantize the fixed-point data of the first bit output by the quantization node to obtain the first bit.

Step 504: the second undetermined model is trained through the plurality of text sample data to obtain a third undetermined model.

Step 505: the quantization scale output by the quantization node is obtained from the third undetermined model.

It should be noted that the quantization scale may be output by the quantization node in the third undetermined model when the training of the quantization scale is completed.

Step 506, a look-up table node is generated according to the quantization scale.

In this step, one possible implementation is: calculating, according to the quantization scale, the first median value corresponding to each target numerical value within a numerical value range corresponding to the fixed-point data type of the first bit, herein the first median value is floating-point data of the second bit; generating a target mapping relationship according to the correspondence relationship between each target numerical value and the first median value; and establishing the look-up table node including the target mapping relationship.

For example, when the fixed-point data type of the first bit is int8, the numerical value range corresponding to the fixed-point data type of the first bit is −127 to 127, and within this numerical value range, the numerical value range of the $x_{max}-x_i$ (i.e., target numerical value) is 0 to 254, and the first median value corresponding to the target numerical value $x_{max}-x_i$ is $e^{-(x_{max}-x_i)S_3}$, where $x_i$ is the element in the fixed-point target vector $\vec{X}$, $x_{max}$ is the largest element in the fixed-point target vector $\vec{X}$, and $S_3$ may be a preset quantization scale. The $e^{-(x_{max}-x_i)S_3}$ corresponding to each numerical value may be pre-calculated within the range of $x_{max}-x_i$ (0 to 254), that is, it is calculated in advance that the first median value is $e^{-0\cdot S_3}$ when $x_{max}-x_i$ is 0, the first median value is $e^{-0\cdot S_3}$ when $x_{max}-x_i$ is 2, the first median value is $e^{-2\cdot S_3}$ when $x_{max}-x_i$ is 8, and the first median value is $e^{-254\cdot S_3}$ when $x_{max}-x_i$ is 254.

Further, when establishing the look-up table node including the target mapping relationship, a second preset function expression for calculating the second median value may be stored in advance, and the second preset function expression may be $$\sum_{j=1}^{M} e^{-(x_{max}-x_j)s_3}$$

in which M represents the dimension of the fixed-point target vector corresponding to the given sample, $x_{max}$ is the maximum numerical value in the fixed-point target vector corresponding to the given sample and $x_j$ is the $j^{th}$ data in the fixed-point target vector corresponding to the given sample, thereby generating a look-up table node including the target mapping relationship and the second preset function expression.

Step 507, the second dequantization node and the Softmax node in the third pending model are replaced with the look-up table node to obtain the preset intention recognition quantization model.

Figure 6:
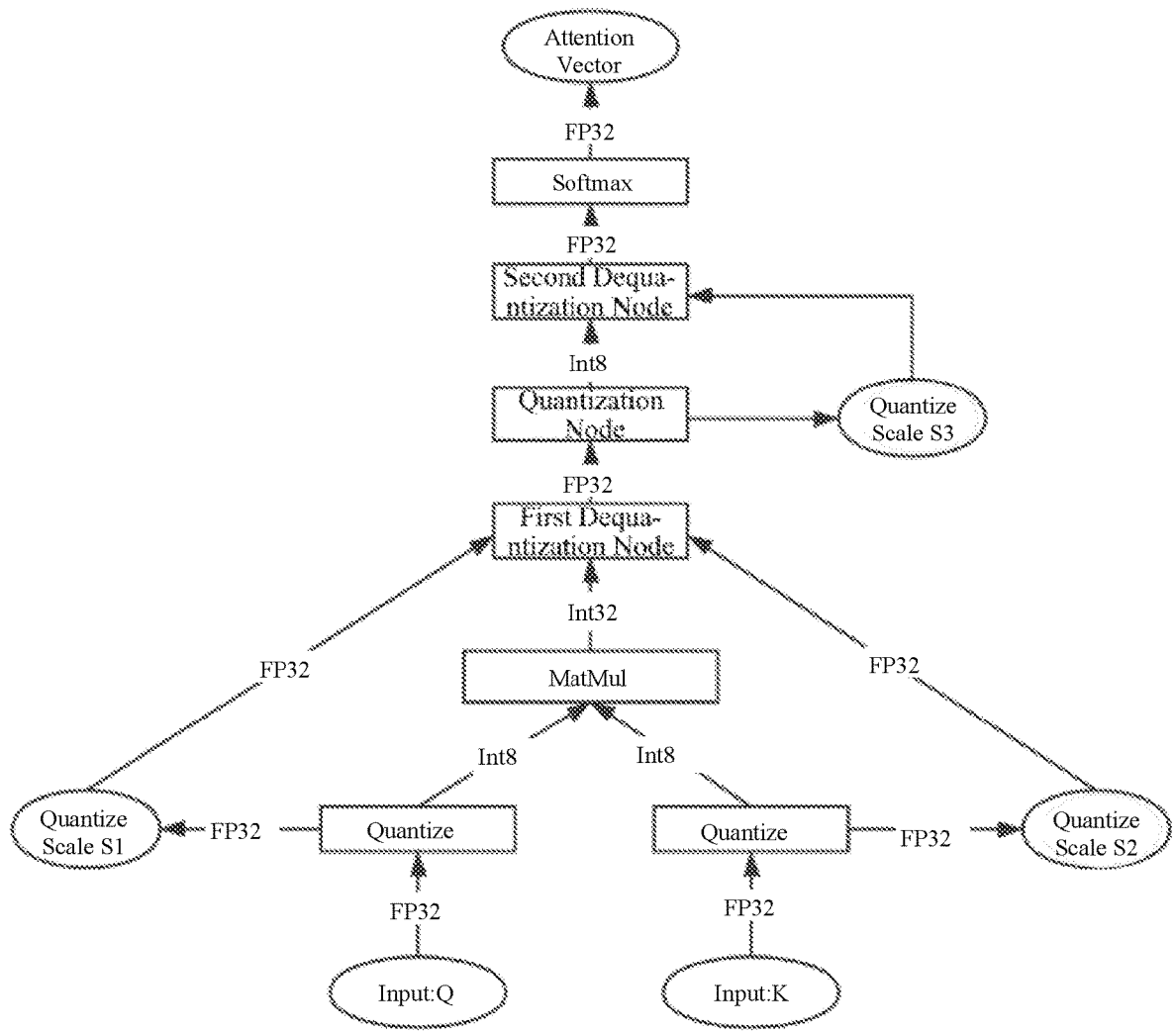
FIG. 6 is a schematic diagram of a multi-head attention structure shown in another exemplary embodiment of the present disclosure.

The structure of the third undetermined model may be shown in FIG. 6, which is a schematic diagram of a multi-head attention structure shown in another exemplary embodiment of the present disclosure. By replacing the second dequantization node and the Softmax node in FIG. 6 with the lookup table node, the multi-head attention structure shown in FIG. 4 may be obtained, so as to obtain a preset intention recognition quantization model including the multi-head attention structure shown in FIG. 4.

In the above technical scheme, the look-up table node replaces the second dequantization node and the Softmax node in the third undetermined model to obtain the preset intention recognition quantization model, and the preset intention recognition quantization model with high accuracy, fast model operation speed, high model recognition efficiency and small model volume can be obtained.

Figure 7:
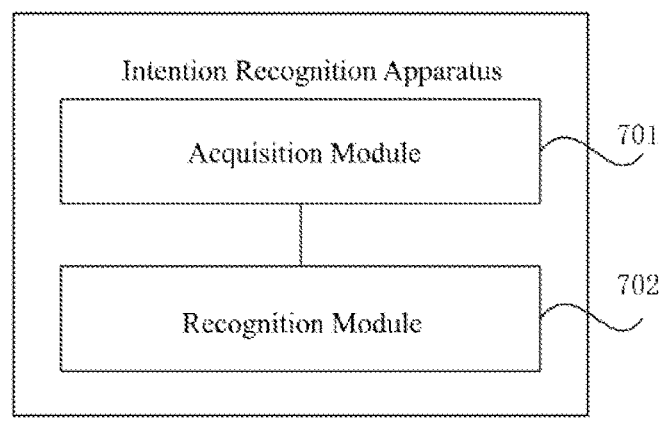
FIG. 7 is a block diagram of an intention recognition apparatus according to an exemplary embodiment of the present disclosure.

FIG. 7 is a block diagram of an intention recognition apparatus according to an exemplary embodiment of the present disclosure. As shown in FIG. 7, the apparatus may include:
an acquisition module 701 configured to acquire a target text to be recognized; and
a recognition module 702 is configured to take the target text as the input of a preset intention recognition quantization model to output the target intention of the target text;
Herein, the preset intention recognition quantization model is configured to quantize the dot product of a query vector and a key vector corresponding to each character in the target text to obtain a fixed-point target vector of a first bit, determine a floating-point attention weight of a second bit corresponding to each character through a target mapping relationship according to the fixed-point target vector, and determine a target intention corresponding to the target text according to the floating-point attention weight, herein the first bit is smaller than the second bit.

According to the technical scheme, the complicated calculation process of determining the floating-point attention weight of the second bit corresponding to each character can be adjusted to the process of finding the correspondence relationship from the target mapping relationship, so as to determine the floating-point attention weight, thereby effectively reducing the model computation and improving the model recognition efficiency.

In some embodiments, the preset intention recognition quantization model includes at least one multi-head attention layer, which includes a quantization node and a look-up table node coupled with the output end of the quantization node.

The quantization node is configured to quantize the dot product of the query vector and the key vector corresponding to the characters in the target text to obtain the fixed-point target vector of the first bit, and input the fixed-point target vector into the look-up table node.

The look-up table node is configured to determine the floating-point attention weight of the second bit corresponding to each character according to the fixed-point target vector through the target mapping relationship.

In some embodiments, the multi-head attention layer further comprises a Matmul node and a first dequantization node coupled with the output end of the Matmul node, and the output end of the first dequantization node is coupled with the input end of the quantization node.

The Matmul node is configured to acquire a query matrix and a key matrix corresponding to a target text sequence to be recognized, herein the query matrix consists of query vectors corresponding to respective characters in the target text, and the key matrix consists of key vectors corresponding to respective characters in the target text.

The Matmul node is further configured to obtain the target product of the query matrix and the key matrix, so as to obtain a specified matrix formed by the dot product of the query vector and the key vector corresponding to each character in the target text, and the specified matrix is fixed-point data of a third bit, and the third bit is greater than the first bit.

The first dequantization node is configured to dequantize the specified matrix to obtain a floating-point product matrix of the second bit.

The quantization node is configured to quantize the floating-point product matrix to obtain the target matrix of the first bit, and the target matrix includes the fixed-point target vectors corresponding to respective characters.

The look-up table node is configured to obtain the maximum numerical value of the fixed-point target vector corresponding to each character in the target matrix, and obtain the target difference between each numerical value of the fixed-point target vector and the maximum numerical value, and for the target difference between each numerical value and the maximum numerical value, the first median value corresponding to the numerical value is searched for from the target mapping relationship according to the target difference to obtain an median value vector corresponding to the fixed-point target vector, wherein, the target mapping relationship includes a correspondence relationship between different differences within the preset difference range corresponding to the fixed-point data type of the first bit and the first median value, which is floating-point data of the second bit, and the floating-point attention weight of the second bit corresponding to each character is determined according to the median value vector.

In some embodiments, the look-up table node is configured to:
acquire a quantization scale output by the quantization node;
calculate a second median value according to the target difference numerical value corresponding to each numerical value in the fixed-point target vector and the quantization scale, wherein the data type of the second median value is the same as that of the first median value; and
determine the floating-point attention weight according to the median value vector and the second median value.

In some embodiments, the determining the floating-point attention weight according to the median value vector and the second median value includes: obtaining the ratio of each numerical value in the median value vector to the second median value to obtain the floating-point attention weight.

According to the technical scheme, the complicated calculation process of determining the floating-point attention weight of the second bit corresponding to each character is adjusted to the process of finding the correspondence relationship from the target mapping relationship through the look-up table node, so that the model computation can be effectively reduced, the model recognition efficiency may be improved, and the accuracy of the preset intention recognition quantization model can be ensured, and the problem of poor accuracy in the fully quantized intention recognition model can be avoided.

In some embodiments, it further comprises a model training module configured to:

acquiring a plurality of text sample data, wherein the text sequence sample data comprises intention labeling data;

training a preset initial model through the plurality of text sample data to obtain a first undetermined model, wherein the preset initial model comprises at least one multi-head attention layer, and the multi-head attention layer comprises a Matmul node and a Softmax node;

adding the first dequantization node after the Matmul node, and adding the quantization node between the first dequantization node and the Softmax node, and a second dequantization node coupled with the output end of the quantization node to obtain a second undetermined model, wherein the first dequantization node is configured to dequantize the fixed-point data of the third bit output by the Matmul node to obtain the floating-point data of the second bit, the quantization node is configured to quantize the floating-point data of the second bit output by the first dequantization node to obtain the corresponding fixed-point data of the first bit, and the second dequantization node is configured to dequantize the fixed-point data of the first bit output by the quantization node to obtain the floating-point data of the second bit corresponding to the fixed-point data of the first bit;

training the second undetermined model through the plurality of text sample data to obtain a third undetermined model;

obtaining the quantization scale output by the quantization node from the third undetermined model;

generating a look-up table node according to the quantization scale; and replacing the second dequantization node and the Softmax node in the third undetermined model with the look-up table node to obtain the preset intention recognition quantization model.

In some embodiments, the model training module is configured to:

calculate the first median value corresponding to each target numerical value within a numerical value range corresponding to the fixed-point data type of the first bit according to the quantization scale, wherein the first median value is floating-point data of the second bit;

generate the target mapping relationship according to the correspondence relationship between each target numerical value and the first median value; and establish the look-up table node including the target mapping relationship.

In the above technical scheme, the look-up table node replaces the second dequantization node and the Softmax node in the third undetermined model to obtain the preset intention recognition quantization model, and the preset intention recognition quantization model with high accuracy, fast model operation speed, high model recognition efficiency and small model volume can be obtained.

In some embodiments, the target mapping relationship is the correspondence between the storage address and the data stored in the storage address, or the target mapping relationship is the correspondence between the list number and data stored in the list of the list number.

With regard to the device in the above embodiment, the specific way in which each module performs operations has been described in detail in the embodiment of the method, and will not be described in detail here.

Figure 8:
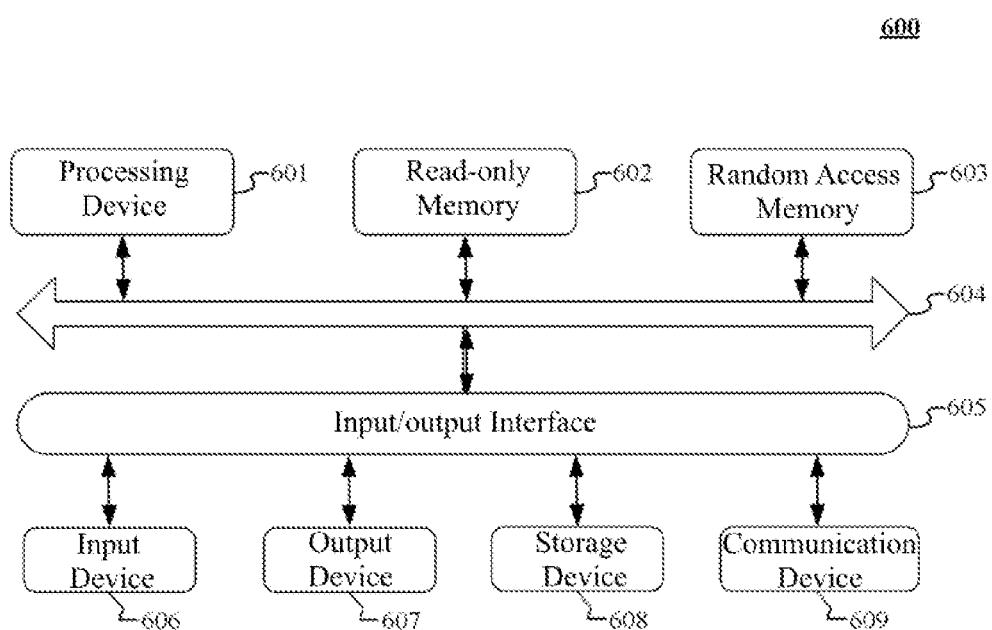
FIG. 8 is a block diagram of an electronic apparatus according to an exemplary embodiment of the present disclosure.

Reference is now made to FIG. 8, which shows a structural schematic diagram of an electronic apparatus (such as a terminal device or a server in FIG. 1) 600 suitable for implementing an embodiment of the present disclosure. The terminal devices in the embodiment of the present disclosure may include, but are not limited to, mobile terminals such as mobile phones, notebook computers, digital broadcast receivers, Personal Digital Assistant (PDA), Tablet Computer (PAD), Portable Multimedia Player (PMP), vehicle-mounted terminals (such as vehicle-mounted navigation terminals), and fixed terminals such as digital TV and desktop computers. The electronic apparatus shown in FIG. 8 is only an example, and should not bring any limitation to the function and application scope of the embodiment of the present disclosure.

As shown in FIG. 8, an electronic apparatus 600 may include a processing device (such as a central processing unit, a graphics processor, etc.) 601, which may perform various appropriate actions and processes according to a program stored in a read-only memory (ROM) 602 or a program loaded from a storage device 608 into a random access memory (RAM) 603. In the RAM 603, various programs and data required for the operation of the electronic apparatus 600 are also stored. A processing device 601, a ROM 602 and a RAM 603 are connected to each other through a bus 604. An input/output (I/O) interface 605 is also connected to the bus 604.

Generally, the following devices may be connected to the I/O interface 605: an input device 606 including, for example, a touch screen, a touch pad, a keyboard, a mouse, a camera, a microphone, an accelerometer, a gyroscope, etc.; an output device 607 including, for example, a liquid crystal display (LCD), a speaker, a vibrator, etc.; including a storage device 608 such as a magnetic tape, a hard disk, etc.; and a communication device 609. The communication device 609 may allow the electronic apparatus 600 to perform wireless or wired communication with other devices to exchange data. Although FIG. 8 shows an electronic apparatus 600 with various devices, it should be understood that it is not required to implement or have all the devices shown. More or fewer devices may alternatively be implemented or provided.

In particular, according to an embodiment of the present disclosure, the process described above with reference to the flowchart may be implemented as a computer software program. For example, embodiments of the present disclosure include a computer program product including a computer program carried on a non-transitory computer-readable medium, which contains program code for executing the method shown in the flowchart. In such an embodiment, the computer program may be downloaded and installed from the network through the communication device 609, or installed from the storage device 608, or installed from the ROM 602. When the computer program is executed by the processing device 601, the above functions defined in the method of the embodiment of the present disclosure are performed.

It should be noted that the computer-readable medium mentioned above in this disclosure may be a computer-readable signal medium or a computer-readable storage medium or any combination of the two. The computer-readable storage medium may be, for example, but not limited to, an electrical, magnetic, optical, electromagnetic, infrared, or semiconductor system, device or device, or a combination of any of the above. More specific examples of computer-readable storage media may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In this disclosure, a computer-readable storage medium may be any tangible medium containing or storing a program, which may be used by or in combination with an instruction execution system, apparatus or device. In this disclosure, a computer-readable signal medium may include a data signal propagated in baseband or as part of a carrier wave, in which computer-readable program codes are carried. This propagated data signal may take many forms, including but not limited to electromagnetic signals, optical signals or any suitable combination of the above. A computer-readable signal medium may also be any computer-readable medium other than a computer-readable storage medium, which may send, propagate or transmit a program for use by or in connection with an instruction execution system, apparatus or device. The program code contained in the computer-readable medium may be transmitted by any suitable medium, including but not limited to: wires, optical cables, radio frequency (RF) and the like, or any suitable combination of the above.

In some embodiments, the client may communicate with any currently known or future developed network protocol, such as HyperText Transfer Protocol (HTTP), and may be interconnected with digital data communication (e.g., communication network) in any form or medium. Examples of communication networks include a local area network (LAN), a wide area network (WAN), the Internet (for example, the Internet) and end-to-end networks (for example, ad hoc end-to-end networks), as well as any currently known or future developed networks.

The computer-readable medium may be included in the electronic apparatus; or it may exist alone without being assembled into the electronic apparatus.

The computer-readable medium carries one or more programs that, when executed by the electronic apparatus, cause the electronic apparatus to:

acquire a target text to be recognized; and take the target text as the input of a preset intention recognition quantization model to output the target intention of the target text;

wherein, the preset intention recognition quantization model is configured to quantize the dot product of a query vector and a key vector corresponding to each character in the target text to obtain a fixed-point target vector of a first bit, determine a floating-point attention weight of a second bit corresponding to each character through a target mapping relationship according to the fixed-point target vector, and determine a target intention corresponding to the target text according to the floating-point attention weight, wherein the first bit is smaller than the second bit.

Computer program codes for performing the operations of the present disclosure may be written in one or more programming languages or their combinations, including but not limited to object-oriented programming languages such as Java, Smalltalk, C++, as well as conventional procedural programming languages such as "C" or similar programming languages. The program code may be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or a part of code that contains one or more executable instructions for implementing specified logical functions. It should be noted that in some alternative implementations, the functions noted in the blocks may also occur in a different order than those noted in the drawings. For example, two blocks shown in succession may actually be executed substantially in parallel, and they may sometimes be executed in the reverse order, depending on the functions involved. It should be noted that each block in the block diagrams and/or flowcharts, and combinations of blocks in the block diagrams and/or flowcharts, may be realized by a dedicated hardware-based system that performs specified functions or operations, or may be realized by a combination of dedicated hardware and computer instructions.

The modules described in the embodiment of the present disclosure may be realized by software or hardware. Among them, the name of the module does not constitute the limitation of the module itself in some cases. For example, the acquisition module may also be described as "acquiring the target text to be recognized".

The functions described above herein may be at least partially performed by one or more hardware logic components. For example, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of this disclosure, a machine-readable medium may be a tangible medium that may contain or store a program for use by or in connection with an instruction execution system, apparatus or device. The machine-readable medium may be a machine-readable signal medium or a machine-readable storage medium. A machine-readable medium may include, but is not limited to, an electronic, magnetic, optical, electromagnetic, infrared, or semiconductor system, device or equipment, or any suitable combination of the above. More specific examples of the machine-readable storage medium may include an electrical connection based on one or more lines, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

According to one or more embodiments of the present disclosure, Example 1 provides an intention recognition method, which includes:
  acquiring a target text to be recognized; and
  taking the target text as the input of a preset intention recognition quantization model to output the target intention of the target text;
  wherein, the preset intention recognition quantization model is configured to quantize the dot product of a query vector and a key vector corresponding to each character in the target text to obtain a fixed-point target vector of a first bit, determine a floating-point attention weight of a second bit corresponding to each character through a target mapping relationship according to the fixed-point target vector, and determine a target intention corresponding to the target text according to the floating-point attention weight, wherein the first bit is smaller than the second bit.

According to one or more embodiments of the present disclosure, Example 2 provides the method of Example 1. The preset intent recognition quantization model includes at least one multi-head attention layer, and the multi-head attention layer comprises a quantization node and a look-up table node coupled with the output end of the quantization node.

The quantization node is configured to quantize the dot product of the query vector and the key vector corresponding to the characters in the target text to obtain the fixed-point target vector of the first bit, and input the fixed-point target vector into the look-up table node.

The look-up table node is configured to determine the floating-point attention weight of the second bit corresponding to each character according to the fixed-point target vector through the target mapping relationship.

According to one or more embodiments of the present disclosure, Example 3 provides the method of Example 2, and the multi-head attention layer further comprises a Matmul node and a first dequantization node coupled with the output end of the Matmul node, and the output end of the first dequantization node is coupled with the input end of the quantization node.

the Matmul node is configured to acquire a query matrix and a key matrix corresponding to a target text sequence to be recognized, wherein the query matrix consists of query vectors corresponding to respective characters in the target text, and the key matrix consists of key vectors corresponding to respective characters in the target text.

the Matmul node is further configured to obtain the target product of the query matrix and the key matrix, so as to obtain a specified matrix formed by the dot product of the query vector and the key vector corresponding to each character in the target text, wherein the specified matrix is fixed-point data of a third bit, and the third bit is greater than the first bit.

The first dequantization node is configured to dequantize the specified matrix to obtain a floating-point product matrix of the second bit.

The quantization node is configured to quantize the floating-point product matrix to obtain the target matrix of the first bit, and the target matrix includes the fixed-point target vectors corresponding to respective characters.

According to one or more embodiments of the present disclosure, Example 4 provides the method of Example 3, and the look-up table node is configured to determine the floating-point attention weight of the second bit corresponding to each character according to the fixed-point target vector through the target mapping relationship, including:
  the look-up table node obtaining the maximum numerical value of the fixed-point target vector corresponding to each character in the target matrix, and obtaining the target difference between each numerical value of the fixed-point target vector and the maximum numerical value; for the target difference between each numerical value and the maximum numerical value, searching for the first median value corresponding to the numerical value from the target mapping relationship according to the target difference, so as to obtain an median value vector corresponding to the fixed-point target vector, wherein, the target mapping relationship includes a correspondence relationship between different differences within a preset difference range corresponding to the fixed-point data type of the first bit and a first median value, wherein the first median value is floating-point data of the second bit, and the floating-point attention weight of the second bit corresponding to each character is determined according to the median value vector.

According to one or more embodiments of the present disclosure, Example 5 provides the method of Example 4 to determine the floating-point attention weight of the second bit corresponding to each character according to the median value vector, including:
  acquiring a quantization scale output by the quantization node;
  calculating a second median value according to the target difference numerical value corresponding to each numerical value in the fixed-point target vector and the quantization scale, wherein the data type of the second median value is the same as that of the first median value; and
  determining the floating-point attention weight according to the median value vector and the second median value.

According to one or more embodiments of the present disclosure, Example 6 provides the method of any one of Examples 1-5, and the preset intent recognition quantization model is obtained in advance by the following ways:
  acquiring a plurality of text sample data, wherein the text sequence sample data comprises intention labeling data;
  training a preset initial model through the plurality of text sample data to obtain a first undetermined model, wherein the preset initial model comprises at least one multi-head attention layer, and the multi-head attention layer comprises a Matmul node and a Softmax node;
  adding the first dequantization node after the Matmul node, and adding the quantization node between the first dequantization node and the Softmax node, and a second dequantization node coupled with the output end of the quantization node to obtain a second undetermined model, wherein the first dequantization node is configured to dequantize the fixed-point data of the third bit output by the Matmul node to obtain the floating-point data of the second bit, the quantization node is configured to quantize the floating-point data of the second bit output by the first dequantization node to obtain the corresponding fixed-point data of the first bit, and the second dequantization node is configured to dequantize the fixed-point data of the first bit output by the quantization node to obtain the floating-point data of the second bit corresponding to the fixed-point data of the first bit;

training the second undetermined model through the plurality of text sample data to obtain a third undetermined model;

obtaining the quantization scale output by the quantization node from the third undetermined model;

generating a look-up table node according to the quantization scale; and replacing the second dequantization node and the Softmax node in the third undetermined model with the look-up table node to obtain the preset intention recognition quantization model.

According to one or more embodiments of the present disclosure, Example 7 provides the method of Example 6, the generating the look-up table node according to the quantization scale including:

calculating the first median value corresponding to each target numerical value within a numerical value range corresponding to the fixed-point data type of the first bit according to the quantization scale, wherein the first median value is floating-point data of the second bit;

generating the target mapping relationship according to the correspondence relationship between each target numerical value and the first median value; and establishing the look-up table node including the target mapping relationship.

According to one or more embodiments of the present disclosure, Example 8 provides an intention recognition apparatus, which includes:

an acquisition module configured to acquire a target text to be recognized; and a recognition module configured to take the target text as an input of a preset intention recognition quantization model to output the target intention of the target text;

wherein, the preset intention recognition quantization model is configured to quantize the dot product of a query vector and a key vector corresponding to each character in the target text to obtain a fixed-point target vector of a first bit, determine a floating-point attention weight of a second bit corresponding to each character through a target mapping relationship according to the fixed-point target vector, and determine a target intention corresponding to the target text according to the floating-point attention weight, wherein the first bit is smaller than the second bit.

According to one or more embodiments of the present disclosure, Example 9 provides the device of Example 8, and the preset intent recognition quantization model includes at least one multi-head attention layer, which includes a quantization node and a look-up table node coupled with the output end of the quantization node.

The quantization node is configured to quantize the dot product of the query vector and the key vector corresponding to the character in the target text to obtain the fixed-point target vector of the first bit, and inputting the fixed-point target vector into the look-up table node.

The look-up table node is configured to determine the floating-point attention weight of the second bit corresponding to each character according to the fixed-point target vector through the target mapping relationship.

According to one or more embodiments of the present disclosure, Example 10 provides the device of Example 9, and the multi-head attention layer further comprises a Matmul node and a first dequantization node coupled with the output end of the Matmul node, and the output end of the first dequantization node is coupled with the input end of the quantization node;

The Matmul node is configured to acquire a query matrix and a key matrix corresponding to a target text sequence to be recognized, herein the query matrix consists of query vectors corresponding to respective characters in the target text, and the key matrix consists of key vectors corresponding to respective characters in the target text.

The Matmul node is further configured to obtain the target product of the query matrix and the key matrix, so as to obtain a specified matrix formed by the dot product of the query vector and the key vector corresponding to each character in the target text, and the specified matrix is fixed-point data of a third bit, and the third bit is greater than the first bit.

The first dequantization node is configured to dequantize the specified matrix to obtain a floating-point product matrix of the second bit.

The quantization node is configured to quantize the floating-point product matrix to obtain the target matrix of the first bit, and the target matrix includes the fixed-point target vectors corresponding to respective characters.

According to one or more embodiments of the present disclosure, Example 11 provides the device of Example 10. The look-up table node is configured to obtain the maximum numerical value of the fixed-point target vector corresponding to each character in the target matrix, and obtain the target difference between each numerical value of the fixed-point target vector and the maximum numerical value, and for the target difference between each numerical value and the maximum numerical value, the first median value corresponding to the numerical value is searched for from the target mapping relationship according to the target difference to obtain an median value vector corresponding to the fixed-point target vector, wherein, the target mapping relationship includes a correspondence relationship between different differences within the preset difference range corresponding to the fixed-point data type of the first bit and the first median value, which is floating-point data of the second bit, and the floating-point attention weight of the second bit corresponding to each character is determined according to the median value vector.

According to one or more embodiments of the present disclosure, Example 12 provides a computer-readable medium on which a computer program is stored, which, when executed by a processing device, realizes the steps of the method described in any one of Examples 1-7.

According to one or more embodiments of the present disclosure, Example 13 provides an electronic apparatus including:

a storage device on which one or more computer programs are stored; and one or more processing devices for executing the one or more computer programs in the storage device to realize the steps of the method described in any one of Examples 1-7.

The above description is only the preferred embodiment of the present disclosure and the explanation of the applied technical principles. It should be understood by those skilled in the art that the disclosure scope involved in this disclosure is not limited to the technical scheme formed by the specific combination of the above technical features, but also covers other technical schemes formed by any combination of the above technical features or their equivalent features without departing from the above disclosure concept. For example, the above features are replaced with (but not limited to) technical features with similar functions disclosed in this disclosure.

Furthermore, although the operations are depicted in a particular order, this should not be understood as requiring that these operations be performed in the particular order shown or in a sequential order. Under certain circumstances, multitasking and parallel processing may be beneficial. Likewise, although several specific implementation details are contained in the above discussion, these should not be construed as limiting the scope of the present disclosure. Some features described in the context of separate embodiments may also be combined in a single embodiment. On the contrary, various features described in the context of a single embodiment may also be implemented in multiple embodiments individually or in any suitable sub-combination.

Although the subject matter has been described in language specific to structural features and/or methodological logical acts, it should be understood that the subject matter defined in the appended claims is not necessarily limited to the specific features or acts described above. On the contrary, the specific features and actions described above are only exemplary forms of implementing the claims. With regard to the device in the above embodiment, the specific way in which each module performs operations has been described in detail in the embodiment of the method, and will not be described in detail here.

The invention claimed is:

1. An intention recognition method, comprising:
acquiring a target text to be recognized; and
taking the target text as an input of a preset intention recognition quantization model to output a target intention of the target text;
wherein the preset intention recognition quantization model is configured to perform a quantization operation on a dot product of a query vector and a key vector corresponding to each character in the target text to generate a fixed-point target vector having a first bit number, determine a floating-point attention weight having a second bit number corresponding to each character in the target text through looking up a target mapping relationship, which is generated and stored in a computer in advance, according to the fixed-point target vector, and generate the target intention corresponding to the target text according to the floating-point attention weight, wherein the first bit number is smaller than the second bit number;
wherein the preset intention recognition quantization model comprises at least one multi-head attention layer, and the multi-head attention layer comprises a look-up table node; and
the look-up table node is configured to receive the fixed-point target vector, take the fixed-point target vector as an input to look up the target mapping relationship to determine a storage address corresponding to the fixed-point target vector, and access the storage address to determine the floating-point attention weight having the second bit number corresponding to each character;
wherein the multi-head attention layer further comprises a quantization node, and the look-up table node is coupled with an output end of the quantization node;
the quantization node is configured to perform the quantization operation on the dot product of the query vector and the key vector corresponding to each character in the target text to generate the fixed-point target vector having the first bit number, and input the fixed-point target vector into the look-up table node;
wherein the multi-head attention layer further comprises a Matmul node and a first dequantization node coupled with an output end of the Matmul node, and an output end of the first dequantization node is coupled with an input end of the quantization node;
the Matmul node is configured to acquire a query matrix and a key matrix corresponding to a target text sequence to be recognized, wherein the query matrix consists of query vectors corresponding to respective characters in the target text, and the key matrix consists of key vectors corresponding to the respective characters in the target text;
the Matmul node is further configured to obtain a target product of the query matrix and the key matrix, so as to obtain a specified matrix formed by the dot product of the query vector and the key vector corresponding to each character in the target text, wherein the specified matrix is fixed-point data having a third bit number, and the third bit number is greater than the first bit number;
the first dequantization node is configured to dequantize the specified matrix to obtain a floating-point product matrix comprising data having the second bit number; and
the quantization node is configured to quantize the floating-point product matrix to obtain a target matrix, and the target matrix includes fixed-point target vectors corresponding to the respective characters.

2. The method according to claim 1, wherein the look-up table node is configured to receive the fixed-point target vector, take the fixed-point target vector as an input to look up the target mapping relationship to determine a storage address corresponding to the fixed-point target vector, and access the storage address to determine the floating-point attention weight having the second bit number corresponding to each character, including:
the look-up table node obtaining a maximum numerical value of the fixed-point target vector corresponding to each character in the target matrix, and obtaining a target difference between each numerical value of the fixed-point target vector and the maximum numerical value; for the target difference between the each numerical value and the maximum numerical value, searching for a first median value corresponding to the each numerical value from the target mapping relationship according to the target difference, so as to generate a median value vector corresponding to the fixed-point target vector, wherein the target mapping relationship includes a correspondence relationship between different differences within a preset difference range corresponding to the fixed-point target vector having the first bit number and first median values, wherein each first median value is floating-point data having the second bit number, and the floating-point attention weight having the second bit number corresponding to each character is determined according to the median value vector.

3. The method according to claim 2, wherein determining the floating-point attention weight having the second bit number corresponding to each character according to the median value vector comprises:
acquiring a quantization scale output by the quantization node;
calculating a second median value according to a target difference numerical value corresponding to each numerical value in the fixed-point target vector and the quantization scale, wherein a data type of the second median value is a same type as that of the first median value; and determining the floating-point attention weight according to the median value vector and the second median value.

4. The method according to claim 3, wherein the determining the floating-point attention weight according to the median value vector and the second median value comprises:

acquiring a ratio of each numerical value in the median value vector to the second median value to obtain the floating-point attention weight.

5. The method according to claim 1, wherein the preset intention recognition quantization model is obtained in advance by:

acquiring a plurality of text sample data, wherein the text sample data comprises intention labeling data;

training a preset initial model through the plurality of text sample data to obtain a first undetermined model, wherein the preset initial model comprises at least one multi-head attention layer, and the multi-head attention layer comprises a Matmul node and a Softmax node;

adding a first dequantization node after the Matmul node, and adding a quantization node between the first dequantization node and the Softmax node, and a second dequantization node coupled with an output end of the quantization node to obtain a second undetermined model, wherein the first dequantization node is configured to dequantize fixed-point data having a third bit number output by the Matmul node to obtain a floating-point data having the second bit number, the quantization node is configured to quantize the floating-point data having the second bit number output by the first dequantization node to obtain a corresponding fixed-point data having the first bit number, and the second dequantization node is configured to dequantize the corresponding fixed-point data having the first bit number output by the quantization node to obtain the floating-point data having the second bit number corresponding to the corresponding fixed-point data having the first bit number;

training the second undetermined model through the plurality of text sample data to obtain a third undetermined model;

obtaining a quantization scale output by the quantization node from the third undetermined model;

generating the look-up table node according to the quantization scale; and replacing the second dequantization node and the Softmax node in the third undetermined model with the look-up table node to obtain the preset intention recognition quantization model.

6. The method according to claim 5, wherein the generating the look-up table node according to the quantization scale comprises:

calculating a first median value corresponding to each target numerical value within a numerical value range corresponding to the fixed-point target vector having the first bit number according to the quantization scale, wherein the first median value is floating-point data having the second bit number;

generating the target mapping relationship according to a correspondence relationship between each target numerical value and the first median value; and establishing the look-up table node including the target mapping relationship.

7. The method according to claim 1, wherein the target mapping relationship is a correspondence between storage addresses and data stored in the storage addresses, or the target mapping relationship is a correspondence between a list number and data stored in a list of the list number.

8. A non-transitory computer-readable medium on which a computer program is stored, wherein the computer program, when executed by a processing device, realizes steps of an intention recognition method, comprising:

acquiring a target text to be recognized; and taking the target text as an input of a preset intention recognition quantization model to output a target intention of the target text;

wherein the preset intention recognition quantization model is configured to perform a quantization operation on a dot product of a query vector and a key vector corresponding to each character in the target text to generate a fixed-point target vector having a first bit number, determine a floating-point attention weight having a second bit number corresponding to each character in the target text through looking up a target mapping relationship, which is generated and stored in a computer in advance, according to the fixed-point target vector, and generate the target intention corresponding to the target text according to the floating-point attention weight, wherein the first bit number is smaller than the second bit number;

wherein the preset intention recognition quantization model comprises at least one multi-head attention layer, and the multi-head attention layer comprises a look-up table node; and the look-up table node is configured to receive the fixed-point target vector, take the fixed-point target vector as an input to look up the target mapping relationship to determine a storage address corresponding to the fixed-point target vector, and access the storage address to determine the floating-point attention weight having the second bit number corresponding to each character;

wherein the multi-head attention layer further comprises a quantization node, and the look-up table node is coupled with an output end of the quantization node;

the quantization node is configured to perform the quantization operation on the dot product of the query vector and the key vector corresponding to each character in the target text to generate the fixed-point target vector having the first bit number, and input the fixed-point target vector into the look-up table node;

wherein the multi-head attention layer further comprises a Matmul node and a first dequantization node coupled with an output end of the Matmul node, and an output end of the first dequantization node is coupled with an input end of the quantization node;

the Matmul node is configured to acquire a query matrix and a key matrix corresponding to a target text sequence to be recognized, wherein the query matrix consists of query vectors corresponding to respective characters in the target text, and the key matrix consists of key vectors corresponding to the respective characters in the target text;

the Matmul node is further configured to obtain a target product of the query matrix and the key matrix, so as to obtain a specified matrix formed by the dot product of the query vector and the key vector corresponding to each character in the target text, wherein the specified matrix is fixed-point data having a third bit number, and the third bit number is greater than the first bit number;

the first dequantization node is configured to dequantize the specified matrix to obtain a floating-point product matrix comprising data having the second bit number; and the quantization node is configured to quantize the floating-point product matrix to obtain a target matrix, and the target matrix includes fixed-point target vectors corresponding to the respective characters.

9. An electronic apparatus comprising:

a storage device on which one or more computer programs are stored; and one or more processing devices for executing the one or more computer programs in the storage device to realize steps of an intention recognition method, comprising:

acquiring a target text to be recognized; and taking the target text as an input of a preset intention recognition quantization model to output a target intention of the target text;

wherein the preset intention recognition quantization model is configured to perform a quantization operation on a dot product of a query vector and a key vector corresponding to each character in the target text to generate a fixed-point target vector having a first bit number, determine a floating-point attention weight having a second bit number corresponding to each character in the target text through looking up a target mapping relationship, which is generated and stored in a computer in advance, according to the fixed-point target vector, and generate the target intention corresponding to the target text according to the floating-point attention weight, wherein the first bit number is smaller than the second bit number;

wherein the preset intention recognition quantization model comprises at least one multi-head attention layer, and the multi-head attention layer comprises a look-up table node; and the look-up table node is configured to receive the fixed-point target vector, take the fixed-point target vector as an input to look up the target mapping relationship to determine a storage address corresponding to the fixed-point target vector, and access the storage address to determine the floating-point attention weight having the second bit number corresponding to each character;

the multi-head attention layer further comprises a quantization node, and the look-up table node is coupled with an output end of the quantization node;

the quantization node is configured to perform the quantization operation on the dot product of the query vector and the key vector corresponding to each character in the target text to generate the fixed-point target vector having the first bit number, and input the fixed-point target vector into the look-up table node;

wherein the multi-head attention layer further comprises a Matmul node and a first dequantization node coupled with an output end of the Matmul node, and an output end of the first dequantization node is coupled with an input end of the quantization node;

the Matmul node is configured to acquire a query matrix and a key matrix corresponding to a target text sequence to be recognized, wherein the query matrix consists of query vectors corresponding to respective characters in the target text, and the key matrix consists of key vectors corresponding to the respective characters in the target text;

the Matmul node is further configured to obtain a target product of the query matrix and the key matrix, so as to obtain a specified matrix formed by the dot product of the query vector and the key vector corresponding to each character in the target text, wherein the specified matrix is fixed-point data having a third bit number, and the third bit number is greater than the first bit number;

the first dequantization node is configured to dequantize the specified matrix to obtain a floating-point product matrix comprising data having the second bit number; and the quantization node is configured to quantize the floating-point product matrix to obtain a target matrix, and the target matrix includes fixed-point target vectors corresponding to the respective characters.

10. The apparatus according to claim 9, wherein the look-up table node is configured to receive the fixed-point target vector, take the fixed-point target vector as an input to look up the target mapping relationship to determine a storage address corresponding to the fixed-point target vector, and access the storage address to determine the floating-point attention weight having the second bit number corresponding to each character, including:

the look-up table node obtaining a maximum numerical value of the fixed-point target vector corresponding to each character in the target matrix, and obtaining a target difference between each numerical value of the fixed-point target vector and the maximum numerical value; for the target difference between the each numerical value and the maximum numerical value, searching for a first median value corresponding to the each numerical value from the target mapping relationship according to the target difference, so as to generate a median value vector corresponding to the fixed-point target vector, wherein the target mapping relationship includes a correspondence relationship between different differences within a preset difference range corresponding to the fixed-point target vector having the first bit number and first median values, wherein each first median value is floating-point data having the second bit number, and the floating-point attention weight having the second bit number corresponding to each character is determined according to the median value vector.

11. The apparatus according to claim 10, wherein determining the floating-point attention weight having the second bit number corresponding to each character according to the median value vector comprises:

acquiring a quantization scale output by the quantization node;

calculating a second median value according to a target difference numerical value corresponding to each numerical value in the fixed-point target vector and the quantization scale, wherein a data type of the second median value is a same type as that of the first median value; and determining the floating-point attention weight according to the median value vector and the second median value.

12. The apparatus according to claim 11, wherein the determining the floating-point attention weight according to the median value vector and the second median value comprises:

acquiring a ratio of each numerical value in the median value vector to the second median value to obtain the floating-point attention weight.

13. The apparatus according to claim 9, wherein the preset intention recognition quantization model is obtained in advance by:

acquiring a plurality of text sample data, wherein the text sample data comprises intention labeling data;

training a preset initial model through the plurality of text sample data to obtain a first undetermined model, wherein the preset initial model comprises at least one multi-head attention layer, and the multi-head attention layer comprises a Matmul node and a Softmax node;

adding a first dequantization node after the Matmul node, and adding a quantization node between the first dequantization node and the Softmax node, and a second dequantization node coupled with an output end of the quantization node to obtain a second undetermined model, wherein the first dequantization node is configured to dequantize fixed-point data having a third bit number output by the Matmul node to obtain a floating-point data having the second bit number, the quantization node is configured to quantize the floating-point data having the second bit number output by the first dequantization node to obtain a corresponding fixed-point data having the first bit number, and the second dequantization node is configured to dequantize the corresponding fixed-point data having the first bit number output by the quantization node to obtain the floating-point data having the second bit number corresponding to the corresponding fixed-point data having the first bit number;

training the second undetermined model through the plurality of text sample data to obtain a third undetermined model;

obtaining a quantization scale output by the quantization node from the third undetermined model;

generating the look-up table node according to the quantization scale; and replacing the second dequantization node and the Softmax node in the third undetermined model with the look-up table node to obtain the preset intention recognition quantization model.

14. The apparatus according to claim 13, wherein the generating the look-up table node according to the quantization scale comprises:

calculating a first median value corresponding to each target numerical value within a numerical value range corresponding to the fixed-point target vector having the first bit number according to the quantization scale, wherein the first median value is floating-point data having the second bit number;

generating the target mapping relationship according to a correspondence relationship between each target numerical value and the first median value; and establishing the look-up table node including the target mapping relationship.

15. The apparatus according to claim 9, wherein the target mapping relationship is a correspondence between storage addresses and data stored in the storage addresses, or the target mapping relationship is a correspondence between a list number and data stored in a list of the list number.

* * * * *